US012596596B2

(12) United States Patent
Bhat et al.

(10) Patent No.: US 12,596,596 B2
(45) Date of Patent: Apr. 7, 2026

(54) USER-SPACE PARALLEL ACCESS CHANNEL FOR TRADITIONAL FILESYSTEM USING CAPI TECHNOLOGY

(71) Applicant: International Business Machines Corporation, Armonk, NY (US)

(72) Inventors: Kavana Bhat, Bangalore (IN); Shajith Chandran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 16/372,783

(22) Filed: Apr. 2, 2019

(65) Prior Publication Data

US 2020/0319944 A1     Oct. 8, 2020

(51) Int. Cl.
*G06F 9/54*     (2006.01)
*G06F 16/13*     (2019.01)
*G06F 16/16*     (2019.01)

(52) U.S. Cl.
CPC .............. *G06F 9/543* (2013.01); *G06F 16/13* (2019.01); *G06F 16/16* (2019.01)

(58) Field of Classification Search
CPC ........... G06F 9/543; G06F 16/16; G06F 16/13
See application file for complete search history.

(56) References Cited

U.S. PATENT DOCUMENTS

| | | | | | |
|---|---|---|---|---|---|
| 2003/0065983 | A1* | 4/2003 | Miller | ................... | G06F 3/0619 |
| | | | | | 714/42 |
| 2009/0240783 | A1* | 9/2009 | Susairaj | .............. | H04L 67/1097 |
| | | | | | 709/217 |
| 2015/0074683 | A1 | 3/2015 | Singh et al. | | |
| 2017/0091182 | A1 | 3/2017 | Wurster et al. | | |
| 2017/0149890 | A1* | 5/2017 | Shamis | ............. | G06F 15/17331 |
| 2017/0168736 | A1 | 6/2017 | Batra et al. | | |
| 2017/0185354 | A1* | 6/2017 | Doshi | ................... | G06F 3/0685 |
| 2017/0199841 | A1* | 7/2017 | Chundattu Parambil | ................... | |
| | | | | | G06F 15/17331 |
| 2017/0235614 | A1* | 8/2017 | Choe | ..................... | G06F 9/5016 |
| | | | | | 718/104 |
| 2018/0288154 | A1* | 10/2018 | Ghazaleh | .............. | G06F 16/182 |
| 2019/0087431 | A1* | 3/2019 | Qiu | ......................... | G06F 16/13 |

OTHER PUBLICATIONS

IEEE Standard Computer Dictionary (Year: 1991).*

* cited by examiner

*Primary Examiner* — Aleksandr Kerzhner
*Assistant Examiner* — Aryan D Toughiry
(74) *Attorney, Agent, or Firm* — Patterson + Sheridan, LLP

(57) ABSTRACT

User process to directly access a file in a file system. A user process first opens a file in the file system for access. In the process of opening the file, a file handle for the file is returned to the user process by an operating system kernel. The user process then makes a read request to a special function unit for one or more blocks of the file in the file system using the file handle. In response, the special function unit, which is coupled to the processor, bypasses the operating system kernel and returns the requested data directly to the user process. A write by the user process may be refused by the computer system or allowed on a selective basis based on a flag in a file system inode corresponding to the block.

20 Claims, 14 Drawing Sheets

USER-SPACE PARALLEL ACCESS CHANNEL FOR TRADITIONAL FILESYSTEM USING CAPI TECHNOLOGY

BACKGROUND

The present invention relates to direct access to filesystem data by user applications bypassing the operating system and more specifically to direct access to file system data by user applications with the aid of a special functional unit attached to the CPU.

SUMMARY

One embodiment of the present invention is a method for accessing blocks of a file in a file system. The method includes requesting that an operating system kernel open the file and in response to the request to open, receiving a file handle from the operating system kernel for accessing the file directly from a user process. The method further includes making a request to a special function unit to read one or more blocks of the file using the file handle, and reading data directly from the file in the file system with the aid of the special function unit.

Further embodiments of the present invention include a system configured to carry out one or more aspects of the above method and a computer program product comprising instructions that a cause a computer system to carry out one or more aspects of the above method.

One aspect of the embodiments is that the performance of user processes handling large amounts of read-only data is improved.

DETAILED DESCRIPTION

Described below are embodiments that permit a user process to read file data directly from a user space buffer after the file is opened. When the file is opened, the operating system kernel enables and authorizes an Accelerator Function Unit (AFU) to serve user space operations with respect to the file. This enablement and authorization are implemented by an operating system kernel by updating status and flags in the operating system kernel, or AFU owned data structures, or both. The user process then uses the acquired file handle to obtain blocks of read data from the file with the help of the AFU. In one embodiment, at the request of the user process, the AFU places the requested read data in a user space buffer which the user process can read. If the user process attempts to write to the file that is opened, the operating system kernel and AFU are both involved in the operation and can decide to either disallow the write or to allow the write on a block-by-block basis by controlling the inode for each block.

Figure 1:
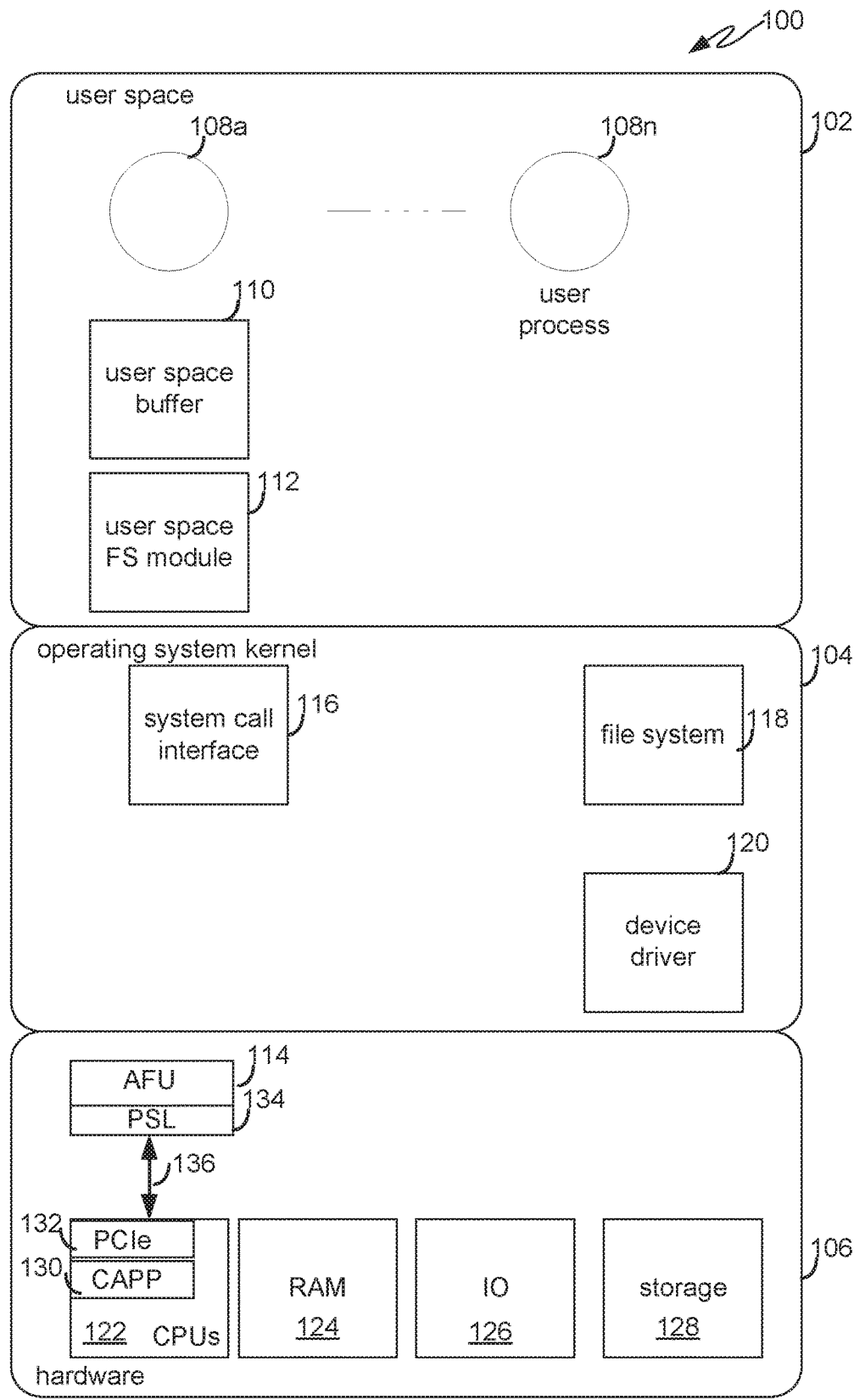
FIG. 1 depicts a block diagram of a computer system that is representative of an architecture in which embodiments may be implemented.

FIG. 1 depicts a block diagram of a computer system that is representative of an architecture in which embodiments may be implemented. The computer system 100 includes computer hardware 106, and computer software, which includes an operating system kernel 104 (or kernel) and a user space 102. The computer hardware includes one or more CPUs 122, each of which includes a single core or multiple cores. The computer hardware further includes a RAM 124, an IO subsystem 126, persistent storage 128, such as disk storage, and a function unit, which in some embodiments is a customized hardware device, such as an FPGA, specifically configured for a particular function. For example, an FPGA can be customized to provide specific functionality such as an extra integer unit or an extra floating-point unit, or special function unit, such as a Fast Fourier Transform (FFT) unit, to the CPUs. An FPGA configured as "a special function unit" is hereinafter referred to as Accelerator Function Unit (AFU) 114.

The AFU 114, according to CAPI technology, has a Power Service Layer (PSL) 134 as an interface to a PCIe bus 136. The PSL 134 includes a local cache for caching data related to the function of the AFU 114, performs address translations so that the AFU 114 can access the virtual space of user applications 108a-n, and has built-in security and data protections to prevent the functions of the AFU 114 from corrupting the data structures of the operating system kernel and the user space 102.

The CPUs 122 further include a Coherent Accelerator Processor Proxy (CAPP) 130 and a PCIe interface 132. The CAPP 130 couples via PCIe interface 132 the CPUs 122 to a PCIe device, such as the AFU 114, and sends all of its commands and data to the AFU 114 according to the PCIe protocol.

In some embodiments, the AFU 114 is integrated onto the CPUs 122 without the PCIe.

The operating system kernel 104 includes a system call interface 116, a file system 118 and one or more device drivers 120 for the file system 118. In one embodiment, the operating system kernel 104 is an operating system such as the Windows® or Linux® operating system. In another embodiment, the operating system kernel 104 is a hypervisor that supports a guest operating system which in turn runs user processes 108*a-n*. In one embodiment, the file system 118 includes inodes and data blocks, where the inodes specify the blocks and their attributes associated with a file. In an embodiment, an inode includes an access flag related to a block described by the inode and a flag that indicates whether or not direct user space access of the file block corresponding to the inode is allowed.

The user space includes one or more user processes 108*a*-108*n*, a user space buffer 110 and a user space FS module 112. The user space FS module 112 acts as the interface between the user processes 108*a-n* and the AFU 114 for read and write operations by the user processes 108*a-n*.

Figure 2:
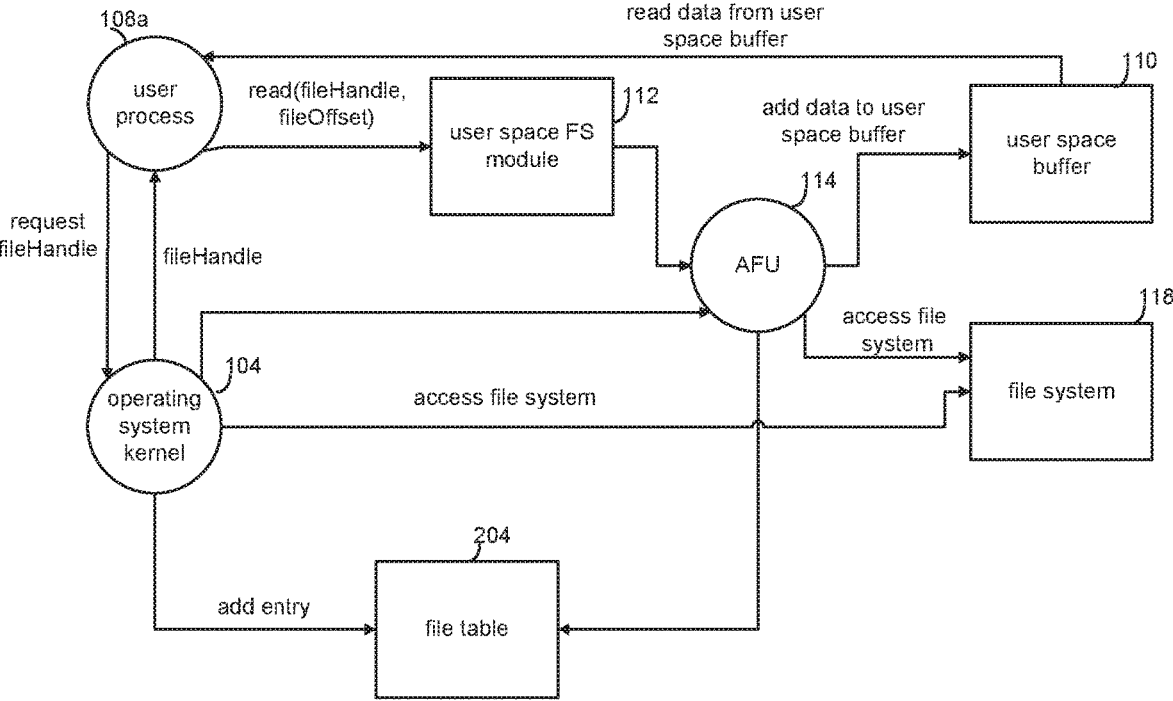
FIG. 2 depicts a block diagram of the processes and system structures employed in an embodiment.

FIG. 2 depicts a block diagram of the processes and system structures employed in an embodiment. The processes and system structures include a user process 108*a*, a user space FS module 112, an operating system kernel 104, an AFU 114, a file table 204, a user space buffer 110, and a file system 118. In one embodiment, the file table 204 resides in kernel memory and is accessible by the AFU 114. In another embodiment, the file table 204 can reside with AFU with the table accessible by the operating system kernel 104.

FIG. 2 indicates that the user process 108*a* is configured to request a file handle from the operating system kernel 104, to receive the requested file handle from the operating system kernel 104 and to make a request to the AFU 114 via user space FS module 112 to read one or more blocks of a file. In the figure, the operating system kernel 104 receives the file handle request and provides the file handle to the user process 108*a*, where the file handle is an index to the file table 204 and each index points to an entry in the file table 204 which contains a process identifier identifying a process that is allowed access to the file and a mode of access (read or write) for the process. In one embodiment, the file table 204 can be allocated per process, and in another embodiment, the file table 204 can be allocated per file system. The operating system kernel 104 also adds an entry into the file table using the file handle after the user request for access has been verified by the operating system kernel 104. Further in the figure, the AFU 114 receives a read request from the user process 108*a* via user space FS module 112 and provides the data to the user process. In one embodiment, the AFU 114 provides the data by adding data to the user space buffer 110, which is accessible to the user process 108*a*.

Figure 3:
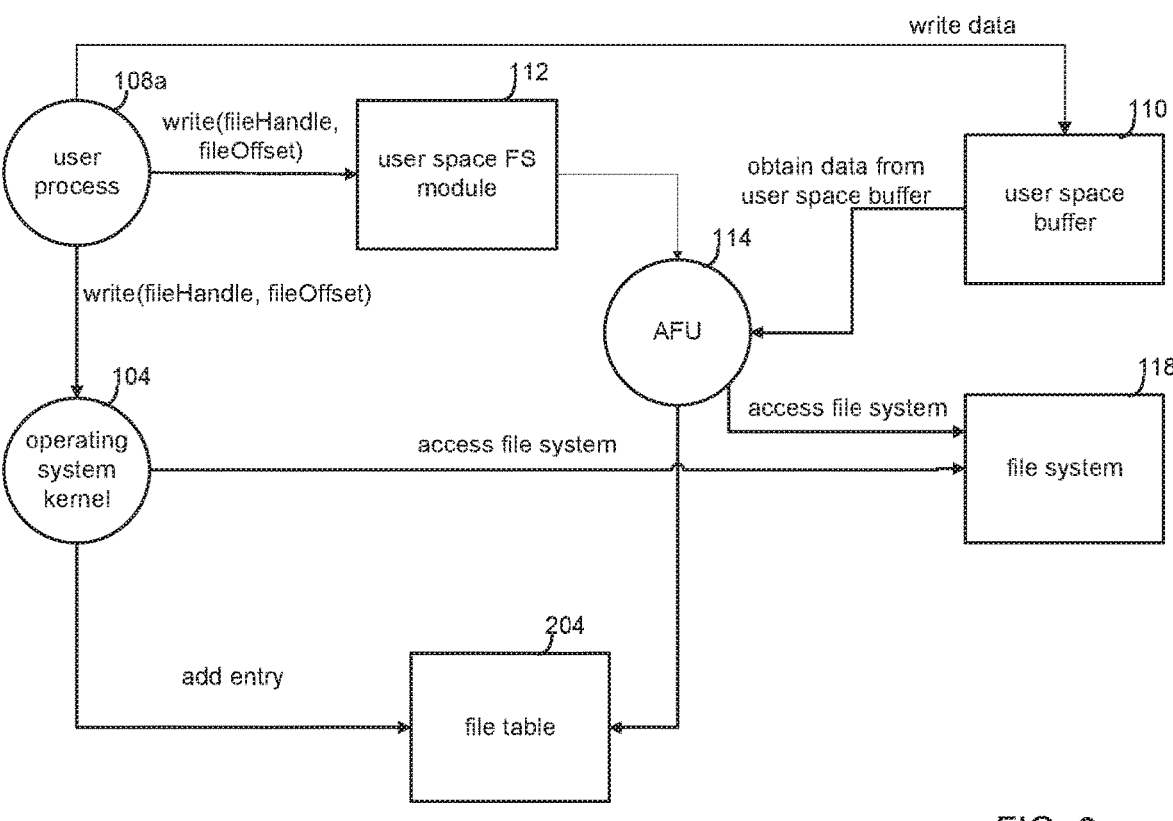
FIG. 3 depicts a block diagram of the processes and system structures employed in an embodiment.

FIG. 3 depicts a block diagram of the processes and system structures employed in an embodiment. The processes and system structures include a user process 108*a*, a user space FS module 112, an operating system kernel 104, an AFU 114, a file table 204, a user space buffer 110, and a file system 118. In the figure, a user process 108*a* can request a write using a given file handle and offset. The operating system kernel 104 can add entries to the file table 204, the operating system kernel 104 and AFU 114 can access the file system, and the AFU 114 can retrieve data from the user space buffer 110 provided by the user process 108*a* and write it to the file system 118 at a requested location.

In the ensuing descriptions, a Send('item' to destination) step is a non-blocking step that communicates the item, which includes but is not limited to data, a string of characters, data structures, functions, and entire objects, to the destination without regard to the underlying communication mechanism. A Received('item' from source) step is a testable predicate indicating that a communicated item has arrived from the source without regard to the underlying communication mechanism, where the 'item' itself is available to the following steps. Communication mechanisms include but are not limited to system calls, shared memory locations, interrupts and system traps, high-speed serial links, queues, including circular queues. For example, in a Send step, the item can include a command and parameters that are placed in a queue. In a Received step, the receiving entity is notified of the items in the queue. The receiving entity then carries out the command using the parameters obtained from the queue and performs a Send step to indicate completion. In the Send step, completion is indicated by marking an item in the queue. In an embodiment, a communication queue can be located in the user space for a user process or in the kernel space for the operating system kernel.

Figure 4A:
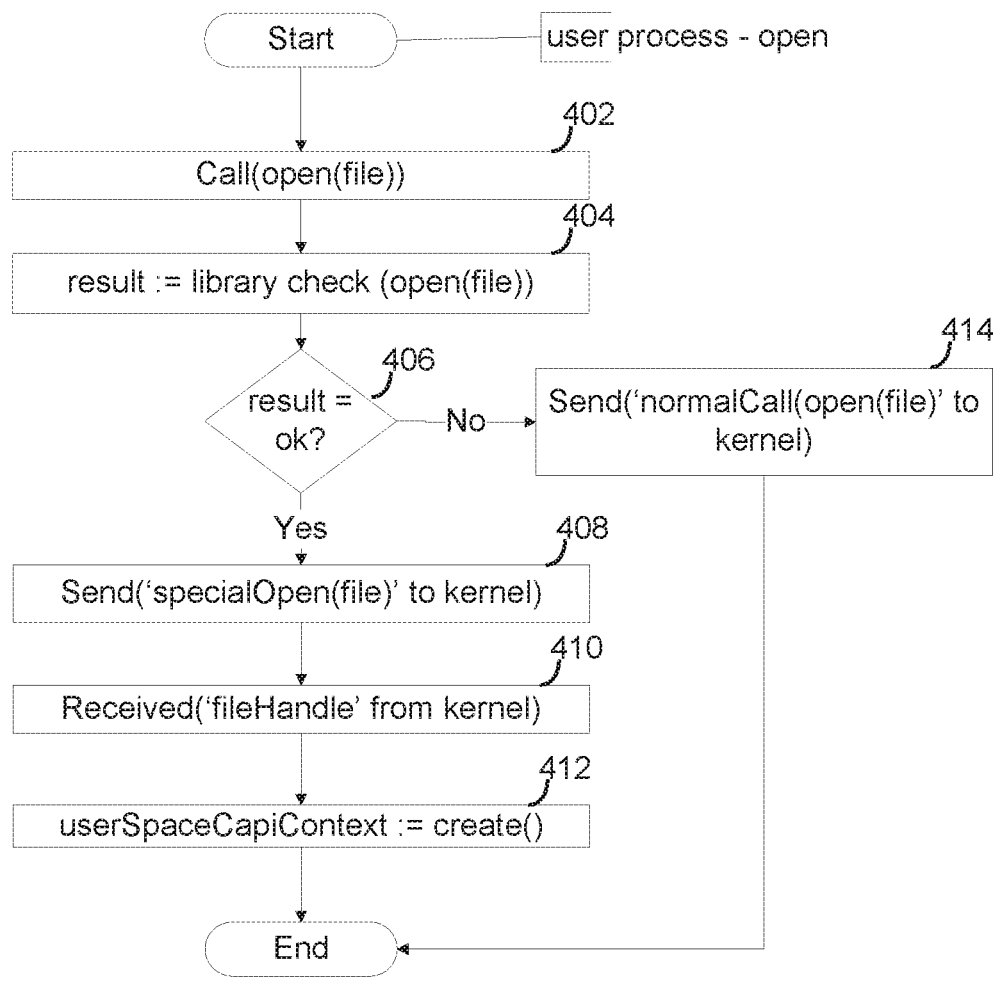
FIG. 4A depicts a flow of operations of a user process requesting to open a file, in an embodiment.

FIG. 4A depicts a flow of operations of a user process requesting to open a file, in an embodiment. In step 402, the user process 108*a* makes a kernel call to open a file. In step 404, a library check is performed on the requested file to determine whether the file system allows direct user space access to the file. If the result is 'ok', meaning that such direct access is allowed, as determined in step 406, then in step 408 the user process 108*a* sends a 'specialOpen(file)' message for the file to the operating system kernel 104. In one embodiment, the Send step is a system call to the operating system kernel 104. In step 410, in response to the request, the user process 108*a* receives a file handle from the operating system kernel 104. When the file handle is received from the operating system kernel 104, then in step 412, the user process 108*a* creates a user space 'capi' context, where 'capi' context is a context owned by a user process permitting the user process to read and write file blocks directly from the file in the file system without using system calls to the operating system kernel 104. Use of the 'capi' context assumes that a system-wide FS property has been set to enable user space access to the file system. If as determined in step 406, the result is not 'ok', then the user process resorts in step 414 to a normal open file call to the operating system kernel 104. In some embodiments, if a number of errors exceeds a threshold occur when the user reads or writes a file that has been opened, the user process also resorts to the normal open file call to the operating system kernel 104.

Figure 4B:
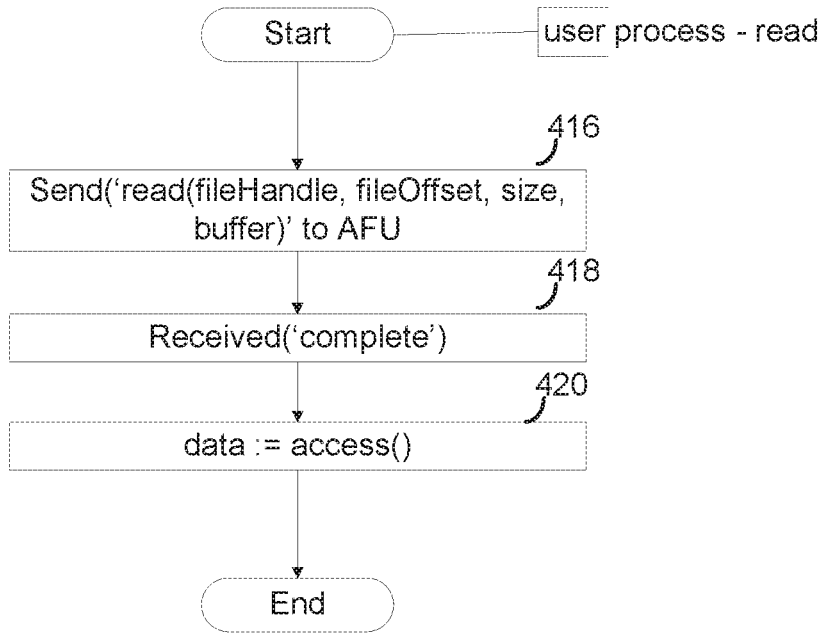
FIG. 4B depicts a flow of operations of a user process requesting a read of one or more blocks of an open file, in an embodiment.

FIG. 4B depicts a flow of operations of a user process requesting a read of one or more blocks of an open file, in an embodiment. In step 416, the user process 108*a* sends to the AFU 114 a 'read(fileHandle, fileOffset, size, buffer)' message specifying the file handle, file offset, size and buffer as parameters for the file block read operation. In step 418, the user process 108*a* receives a 'complete' message indicating that the requested data is available. In one embodiment, the requested data is loaded into a buffer, such as user space buffer 110, accessible by the user process 108*a*. In step 420, the user process 108*a* accesses the data. Steps 416-420 are repeated for each user process read access to the opened file without calling the operating system kernel 104 for each read.

Figure 4C:
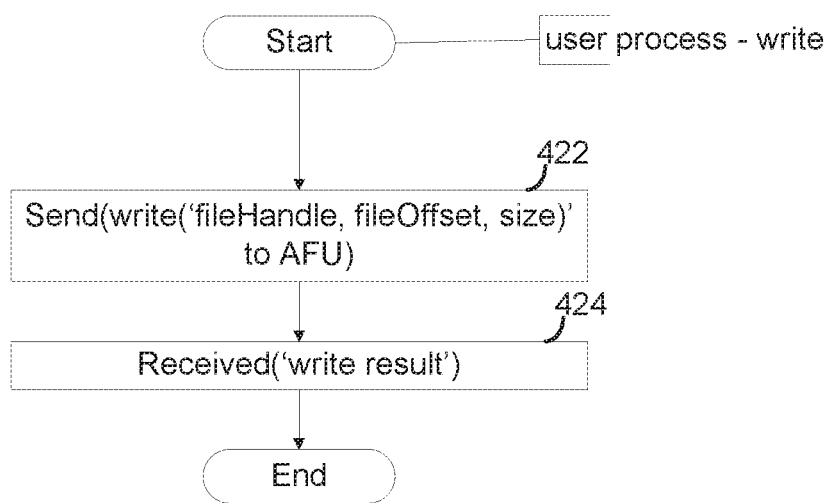
FIG. 4C depicts a flow of operations of a user process requesting to write data to an open file, in an embodiment.

FIG. 4C depicts a flow of operations of a user process requesting to write data to an open file, in an embodiment. In step 422, the user process sends a 'write(fileHandle, fileOffset, size)'. In step 424, the user process receives a write result message. The 'write result' message may indicate an error, indicating that writes are not allowed or that the write was performed. The write result depends on the options that the AFU 114 and operating system kernel 104 provide for writes to an opened file.

Figure 5A:
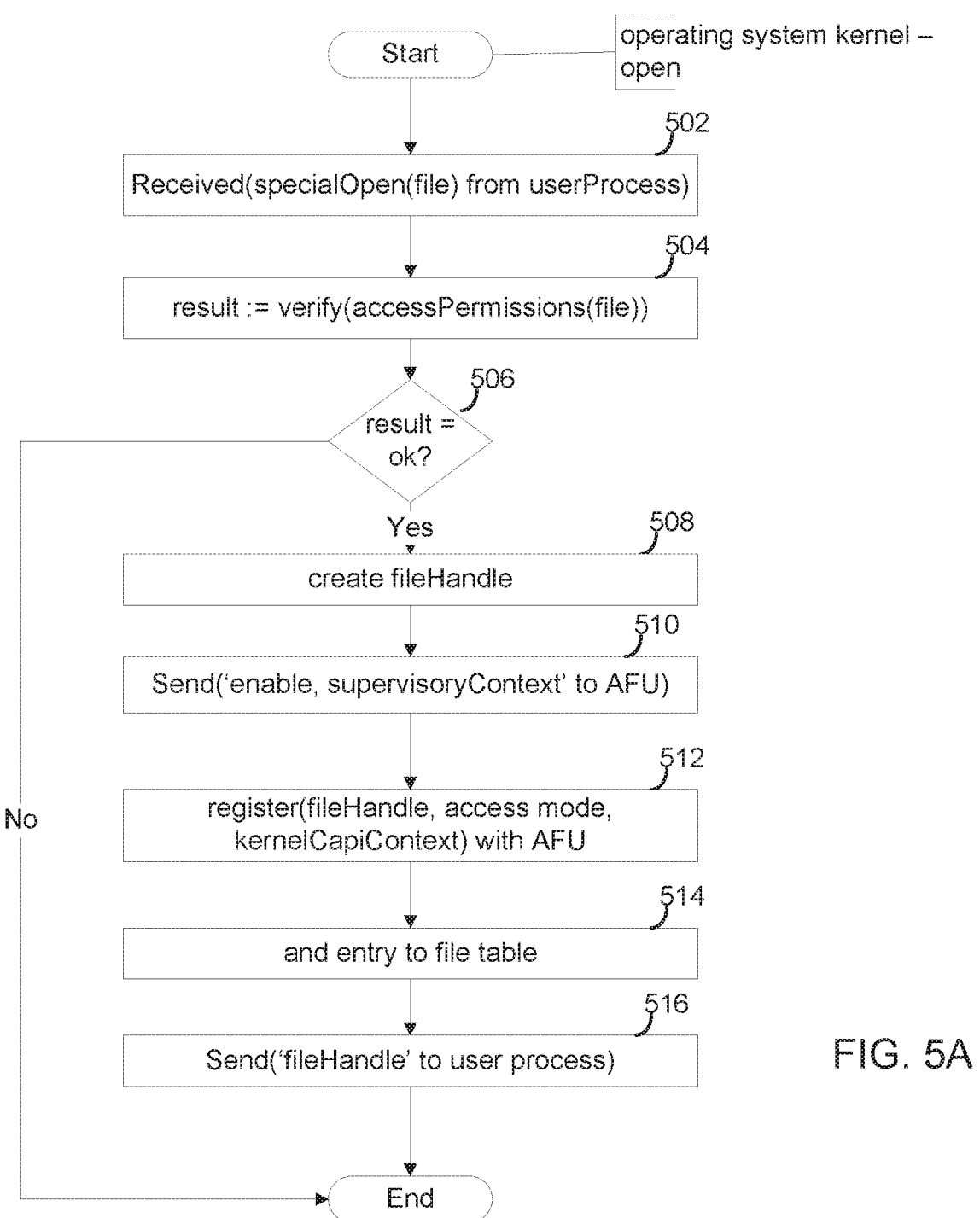
FIG. 5A depicts a flow of operations of the operating system kernel processing an open file request, in an embodiment.

FIG. 5A depicts a flow of operations of the operating system kernel processing an open file request, in an embodiment. In step 502, the operating system kernel 104 receives from the user process 108*a* a 'specialOpen(file)' message to open the specified file. In step 504, the operating system kernel 104 verifies access permissions for the requested file. If the result is 'ok', meaning that the request has the proper permissions for accessing the file as determined in step 506, then the operating system kernel 104 in step 508 creates a file handle, which in some embodiments is a unique numerical id for the file. In step 510, the operating system kernel 104 in the supervisory context sends an 'enable' to the AFU 114. In step 512, the operating system kernel 104 registers with the AFU 114 the file handle, the access mode (either read or write) using the kernel Capi context. In step 514, the operating system kernel 104 adds a new entry to the file table at a location in the table pointed to by the file handle. The new entry contains at least a process id (PID) identifying the process for which the file is opened and the access mode (read or write) to the file allowed by the process. In step 516, the operating system kernel 104 sends the file handle to the user process 108*a*.

Figure 5B:
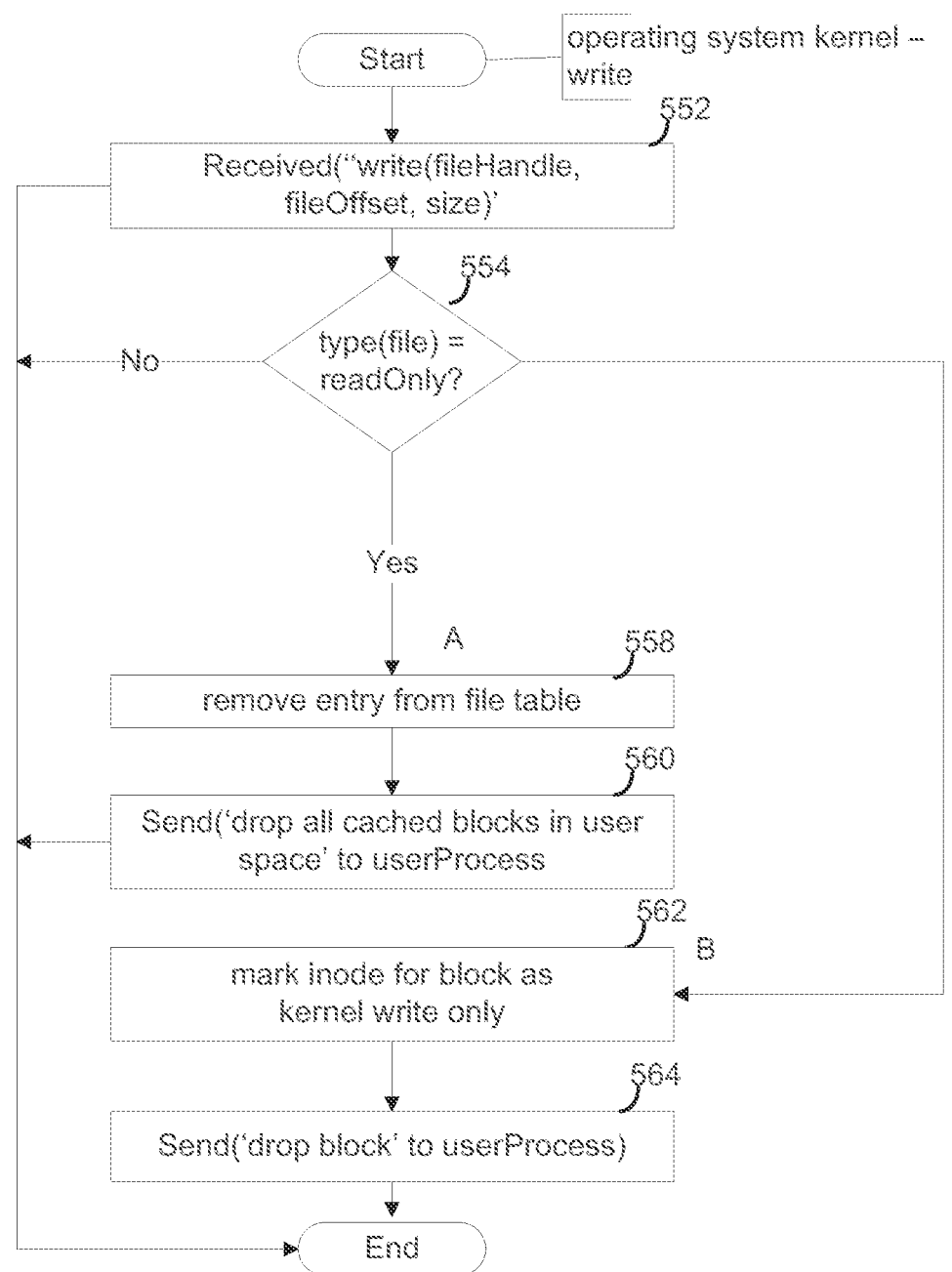
FIG. 5B depicts a flow of operations of the operating system kernel processing a write of data to an open file, in an embodiment.

FIG. 5B depicts a flow of operations of the operating system kernel processing a write of data to an open file, in an embodiment. There are several cases in which the operating system kernel 104 may not allow a write. First, the opened file is being read by a user process different from the user process writing the file. Second, the opened file is being written by multiple user processes. In the first case, the written blocks can become cached in a buffer in the operating system kernel 104 so that the blocks of the file on the file system are not up-to-date with the cache in the operating system kernel 104. In the second case, the writes by different processes may create ordering problems with the write data.

The operating system kernel handles these cases according to alternatives A and B in FIG. 5B.

In alternative A, the operating system kernel 104 receives in step 552 a 'write(fileHandle, fileOffset, size)' message, which in an embodiment is a system call. In step 554, the operating system kernel 104 determines whether the file specified by the file handle is 'read-only'. If the file is 'read-only', then in alternative A in step 558, the operating system kernel 104 removes the entry from the file table 204 in step 558 and send a 'drop all cached pages in user space' message to the user process 108*a* in step 560, thereby causing invalidation of all of the cached blocks in the user space buffer 110. In this case, the data from the user space buffer 110 is removed because it is stale (i.e., not up-to-date) due to the write data in the kernel buffer. In some embodiments, sending a 'drop all cached pages in user space' message to the user process is performed via a special signal sent to the user process.

In alternative B, if the file is 'read-only', the operating system kernel 104 can decide in step 562 to mark the inode for the block as kernel write-only. In step 564, the operating system kernel also sends a 'drop block' message to the user process to drop from the user space buffer 110 the block whose inode was marked in step 562. In one embodiment, the 'drop block' message can be a special signal sent to the user process. The marking of the inode for the block will prevent the user process from reading the block via the AFU 114, thereby causing an error in the user read operation. The user process 108*a* is then forced to read the block through the traditional kernel path. In this case, the user process reads are only allowable via a normal system call because the most up-to-date data resides in the kernel buffer.

In some embodiments, if more than one user process accesses the same file, the operating system kernel can decide to require that the user processes resort back to traditional file system access via the operating system kernel to avoid having the user space buffer 110 containing multiple copies of the file, which may cause excessive contention for system memory. In this case, the operating system kernel 104 forces the user process 108*a* to take the 'NO' path in step 406 of FIG. 4A. In one embodiment, the operating system kernel 104 forces the user process 108*a* to take the 'NO' path by revoking authorization that it gave to the user process during the special open call. Revoking authorization causes a number of failures by the user process when it attempts access after the revocation. When the number of failures exceeds a threshold, the user space application performs a 'normal' open(file) and all subsequent read and write requests to the file will be handled by the operating system kernel.

Figure 5C:
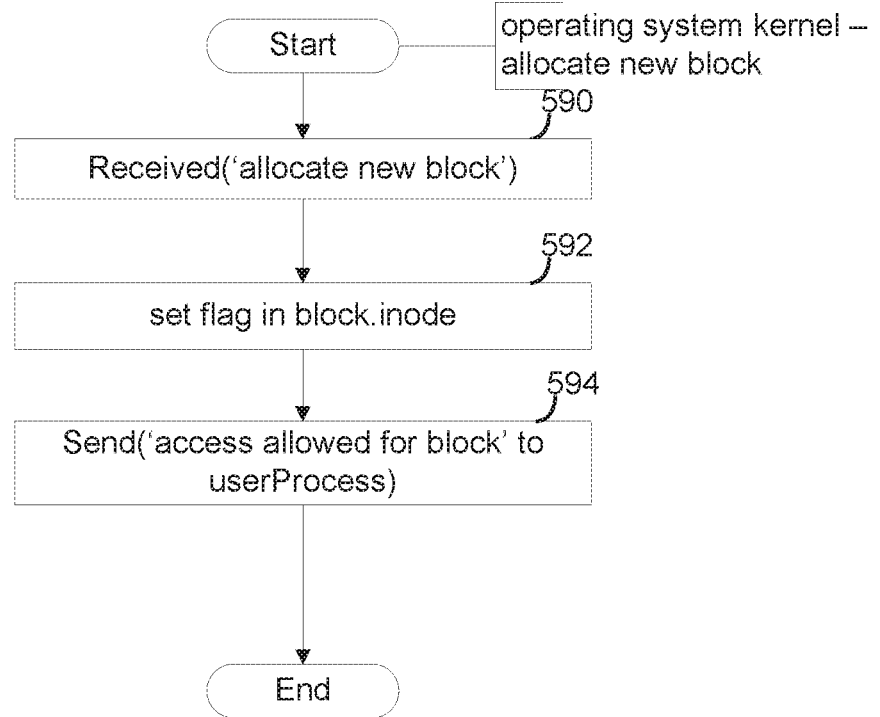
FIG. 5C depicts a flow of operations of the operating system kernel processing an allocation of a new block request, in an embodiment.

FIG. 5C depicts a flow of operations of the operating system kernel processing an allocation of a new block request, in an embodiment. In step 590, the operating system kernel 104 receives a 'allocate new block' message. In step 592, the operating system kernel 104 sets the access flag in the inode for the block and sends in step 594 an 'access allowed for block' message to the user process 108*a* indicating that access is allowed for the block.

Figure 6A:
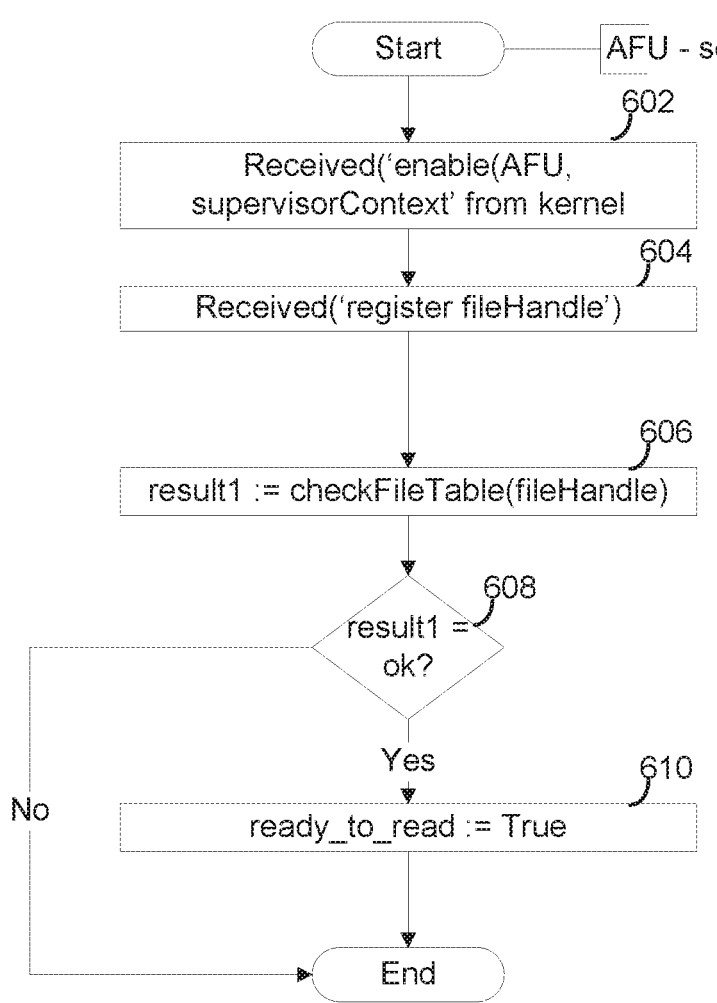
FIG. 6A depicts the flow of operations for setting up the AFU, in an embodiment.

FIG. 6A depicts the flow of operations for setting up the AFU, in an embodiment. In step 602, the AFU 114 receives an 'enable AFU' message from the operating system kernel 104 while in the supervisor context. In step 604, the AFU 114 receives a 'register file handle' message from the operating system kernel 104. In step 606, the AFU 114 checks the file table based on the file handle received, and if as determined in step 608, access is ok, meaning that a particular user process has permission to read the opened file, then in step 610 the AFU 114 sets a 'ready_to_read' flag to true. At this point, the AFU 114 is setup and ready to receive read requests from the user process 108*a*.

Figure 6B:
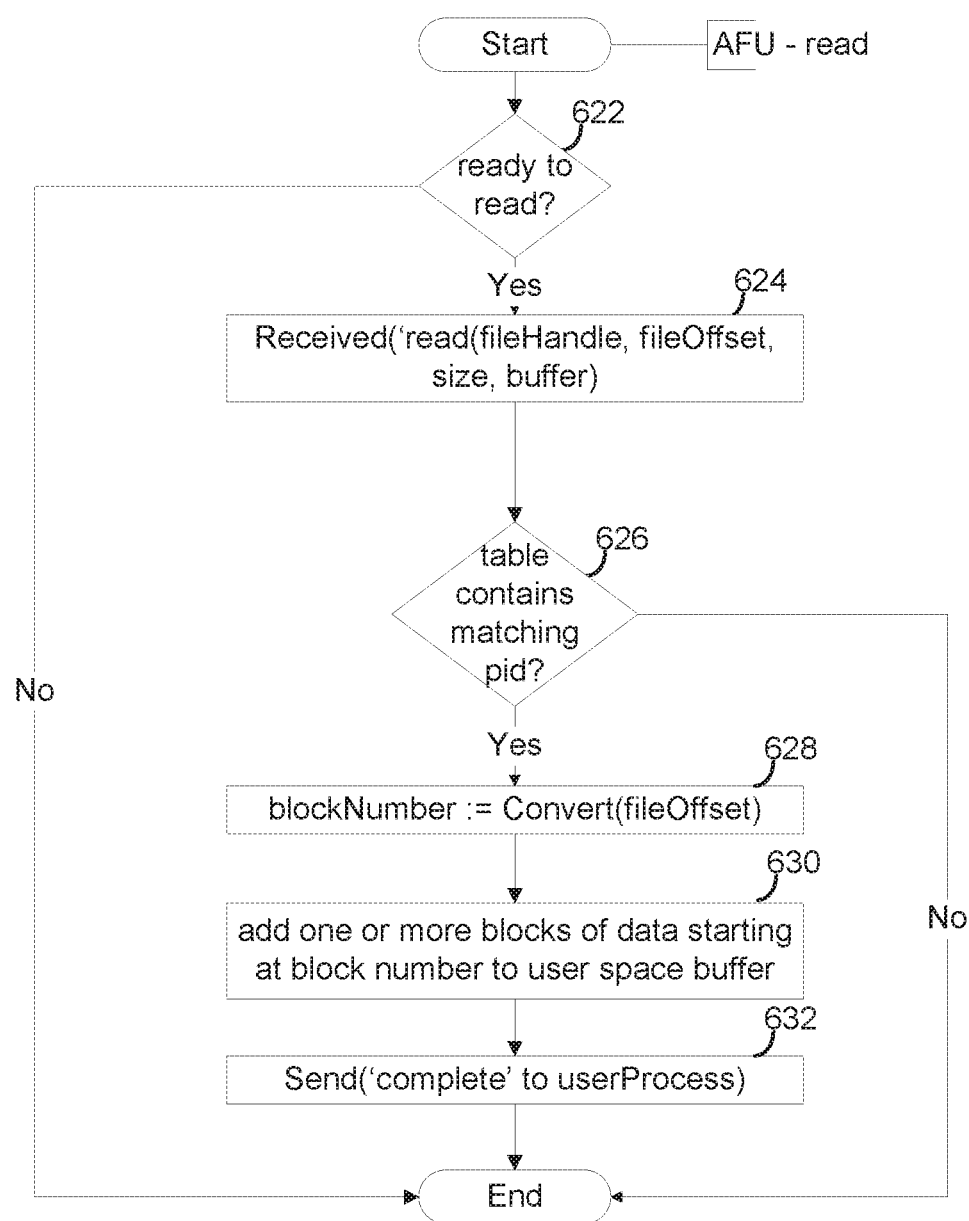
FIG. 6B depicts the flow of operations of the AFU processing a read request to an open file, in an embodiment.

FIG. 6B depicts the flow of operations of the AFU processing a read request to an open file, in an embodiment. In step 622, the AFU 114 checks the 'ready_to_read flag'. If as determined in step 622, the flag indicates that the AFU 114 has been set up for reads, then the AFU 114 awaits a read request in step 624. Upon receipt of the read request message specifying the file handle the file offset, the size of the read and the user space buffer, the AFU 114 checks, in step 626, the file table for a process id (PID) matching the requesting user process 108*a*. If there is a match, then in step 628, the AFU 114 converts the file offset to a block number and in step 630 adds one or more blocks starting at the computed block number to the user space buffer 110. In step 632, the AFU 114 sends a 'complete' message to the user process 108*a* indicating that the requested one or more blocks are available to the user process 108*a*.

Figure 7A:
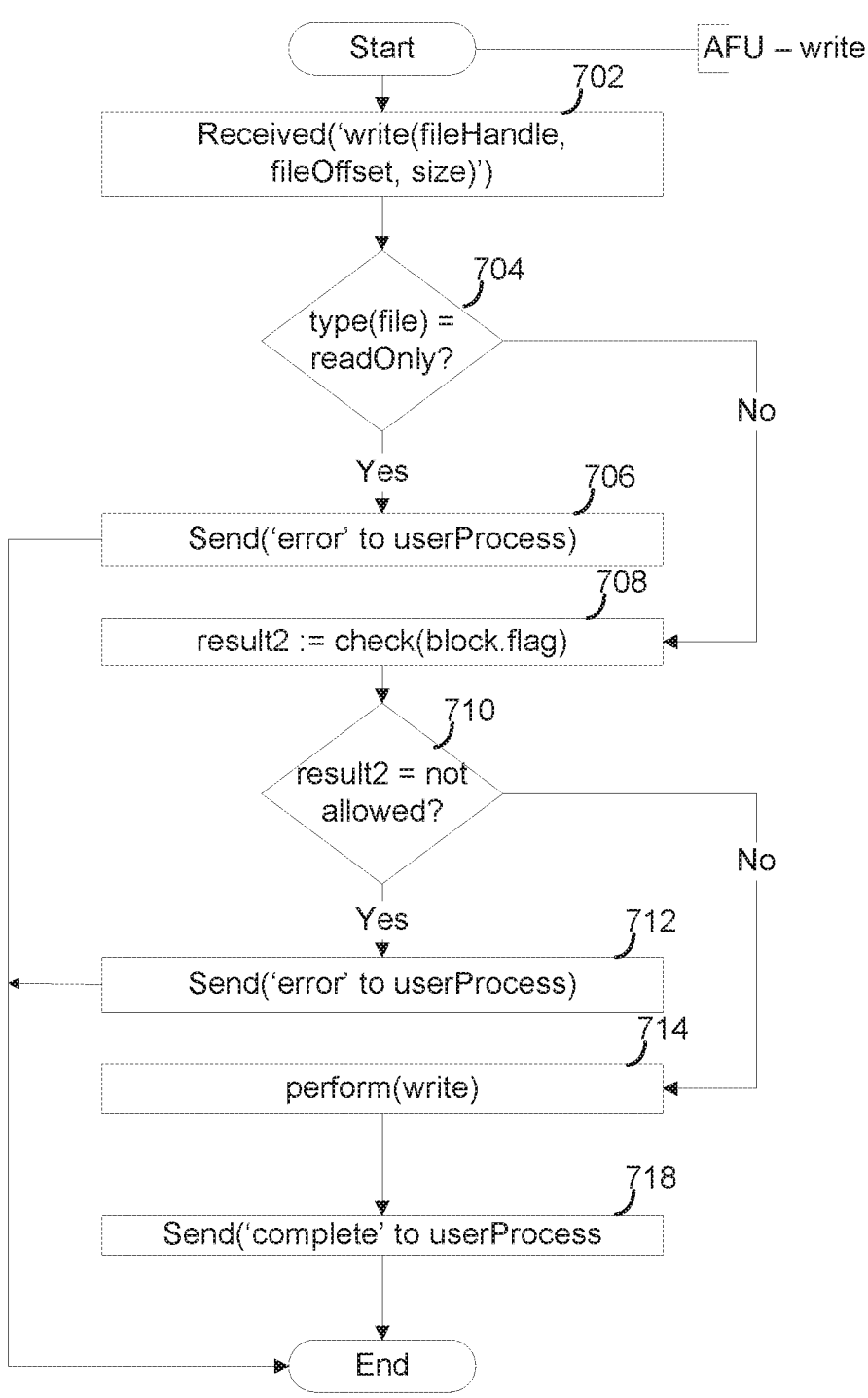
FIG. 7A depicts the flow of operations of the AFU processing a write data request to an open file, in an embodiment.

FIG. 7A depicts the flow of operations of the AFU processing a write data request to an open file, in an embodiment. In step 702, the AFU 114 receives 'write (fileHandle, fileOffset, size)' message. In step 704, the AFU 114 determines whether the file to be written is 'read-only' or not. If the file is 'read only', then in step 706 the AFU 114 sends an 'error' message to the user process 108*a*. If the file is not 'read only', then in step 708, the AFU 114 checks the access flag in the inode for the block to determine whether is access is allowed. If 'result2' indicates that access is not allowed, as determined in step 710, then in step 712, the AFU 114 sends an 'error' message to the user process. If access is allowed, then in step 714, the AFU 114 performs the write operation on the block using data in the user buffer 110. In step 718, the AFU 114 sends a 'complete' message to the user process 108*a*.

Figure 7B:
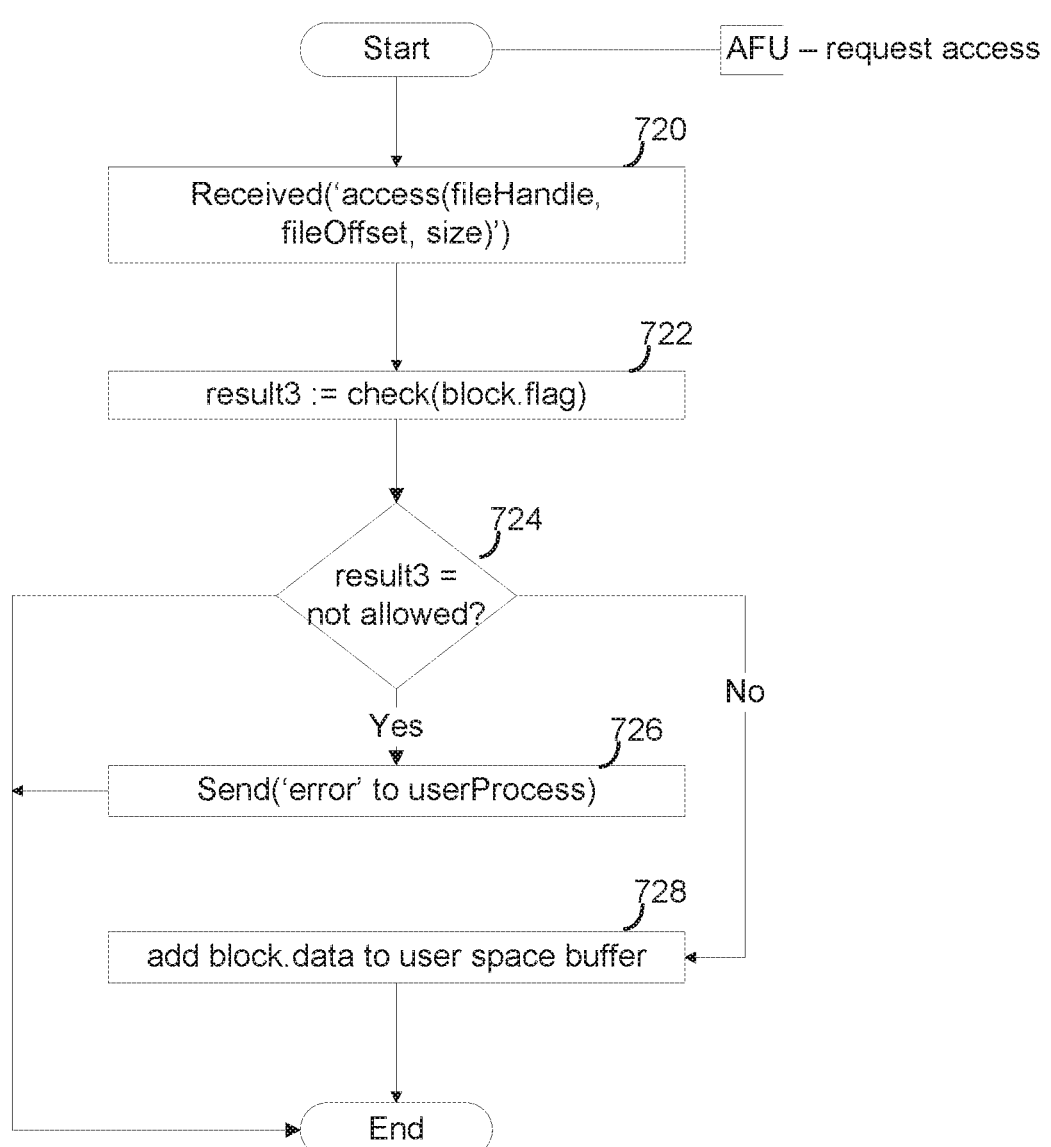
FIG. 7B depicts the flow of operations of the AFU processing an access request to an open file, in an embodiment.

FIG. 7B depicts the flow of operations of the AFU processing an access request to an open file, in an embodiment. In step 720, the AFU 114 receives an 'access (file-Handle, fileOffset, size)' message which is a request for write mode access of a file specified by the file handle. In step 722, the AFU 114 checks the access flag for the requested block, and if the access is not allowed as determined in step 724, then the AFU 114 sends in step 726 an 'error' message to the user process. If access is allowed, then the AFU 114 adds the requested block to the user space buffer 110 in step 728. Access becomes allowed when the operating system kernel 104 allocates a new block and sets the flag in the inode allowing access in step 592 of FIG. 5C.

Figure 8:
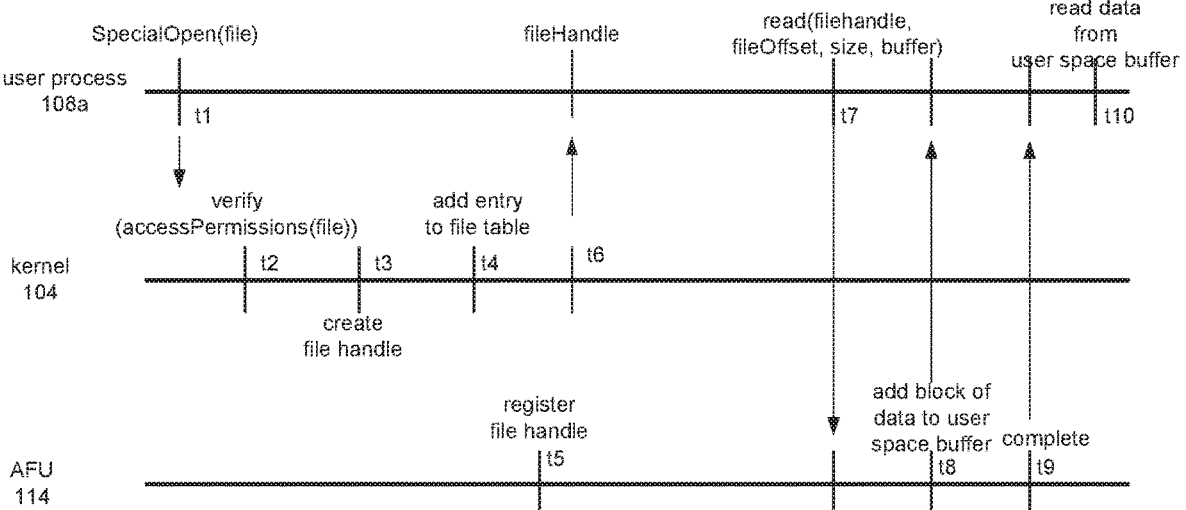
FIG. 8 depicts a flow of operations in time for the direct reading of file data by the user process.

FIG. 8 depicts a flow of operations in time for the direct reading of file data by the user process. At time t1, the user process sends a 'specialOpen(file)' request to the operating system kernel 104. At time t2, the operating system kernel 104 verifies access permissions of the file specified in the special open request. At time t3, the operating system kernel 104 creates a file handle. At time t4, the operating system kernel 104 adds an entry to the file table 204 using the file handle. At time t5, the AFU 114 registers the file handle. At time t6, the operating system kernel 104 returns the file handle to the user process 108a. At time t7 the user process 108a submits a 'read(fileHandle, fileOffset, size, buffer)' request to the AFU 114. A time t8, the AFU 114 adds the requested data block to the user space buffer, and at time t9 sends a 'complete' message to the user process. At time t10, the user process 108a reads the file block of data directly from the user space buffer 110.

Thus, the user process, in cooperation with the operating system kernel and the AFU, is able to read data blocks of a file in the file system directly without calls to the operating system kernel. All that is required is that the user process request and receive a file handle from the AFU and then make a read request to the AFU, after which the user process simply reads the requested data from a user accessible area.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In the context of the present invention, a user may access applications or related data available in the cloud. For example, the embodiment of the present invention could execute on a computing system in the cloud. In such a case, the embodiments could operate to allow a user process on the computing system in the cloud to access file data of a file system without making calls to an operating system kernel running on the computer system. Doing so allows a user to access this information from any computing system so enabled and attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for accessing blocks of a file in a file system, the method comprising:
   requesting that an operating system kernel of a computer system open the file of the file system, the file system residing in a space that includes the operating system kernel;
   in response to the request to open, receiving a file handle from the operating system kernel for accessing the file of the file system directly from a buffer residing in user space and not in the file system, by a user process;
   making a request to a special function unit of the computer system to read one or more blocks of the file contained in the file system using the file handle, wherein the special function unit is attached to a CPU of the computer system that runs the operating system kernel and the user process, obtains the one or more blocks from the file of the file system without making system calls to the operating system kernel, and adds the one or more blocks directly to the buffer residing in the user space; and
   reading data directly from the file of the file system with aid of the special function unit by reading the data in the buffer residing in the user space.

2. The method of claim 1, wherein requesting that an operating system kernel open the file includes:

making an open system call to the operating system kernel by the user process, wherein the operating system kernel verifies the call, creates the file handle for the file, enables the special function unit to receive requests to read blocks of the file, registers the file handle with the special function unit, adds an entry to a file table to record an association between the user process and the file, and sends the file handle to the user process making the request.

3. The method of claim 1, wherein the file system is part of the computer system that includes the special function unit and the CPU.

4. The method of claim 3, wherein making a request to the special function unit to read one or more blocks of an opened file using the file handle includes sending a read request specifying the file handle, a file offset, a size and the user space buffer to the special function unit.

5. The method of claim 4, wherein in response to receiving the read request, the special function unit notifies the user process that the one or more blocks are available after adding the one or more blocks to the user space buffer.

6. The method of claim 4, further comprising:
issuing a request to write data to the file;
in response to the request to write, receiving an indication that the write request is not allowed; and
in response to the indication, all blocks related to the file are removed from the user space buffer.

7. The method of claim 4, further comprising:
issuing a request to write data to the file,
wherein in response to the request to write, the special function unit determines that a flag in an inode corresponding to the one or more blocks of file data allows the one or more blocks to be written, performs the write on the one or more blocks, and sends an indication that the write request is completed; and
receiving the indication that the write request is completed.

8. A computer system comprising:
a special function unit;
a processor attached to the special function unit;
a memory coupled to the processor and the special function unit, the memory containing an operating system kernel and a user process runnable by the processor, the user process running in a user space supported by the operating system kernel, the memory including a buffer residing in the user space and not a file system and accessible to the user process; and
persistent storage containing files of a file system, the file system residing in a space that includes the operating system kernel;
wherein the user process is configured to:
make a request that the operating system kernel open a file of the file system;
in response to the request to open, receive a file handle from the operating system kernel for accessing the file of the file system directly from the user process;
make a request to the special function unit to read one or more blocks of the file of the file system using the file handle without making system calls to the operating system kernel and to add the one or more blocks directly to the buffer residing in the user space; and
read data directly from the file of the file system with aid of the special function unit by reading the buffer residing in the user space.

9. The system of claim 8, the user process being configured to make a request that the operating system kernel open a file includes being configured to:
make an open system call to the operating system kernel by the user process,
wherein the operating system kernel verifies the call, creates the file handle for the file, enables the special function unit to receive requests for blocks of the file, registers the file handle with the special function unit, adds an entry to a file table to record an association between the user process and the file, and sends the file handle to the user process making the request.

10. The system of claim 8, wherein the user process being configured to make a request to the special function unit to read one or more blocks of the opened file using the file handle includes being configured to send a read request specifying the file handle, a file offset, a size and the user space buffer to the special function unit.

11. The system of claim 10, wherein in response to receiving the read request, the special function unit notifies the user process that the one or more blocks are available.

12. The system of claim 10, wherein the user process is further configured to:
issue a request to write data to the opened file; and
in response, receive an indication that the write request is not allowed.

13. The system of claim 10, wherein the user process is further configured to:
issue a request to write data to the file, wherein in response to the request to write, the special function unit determines that a flag in an inode corresponding to the one or more blocks of file data allows the one or more blocks to be written, performs the write on the one or more blocks, adds the written blocks to the user space buffer, and sends an indication to the user process that the write is completed; and
receive the indication that the write request is completed.

14. A computer program product for accessing blocks of a file in a file system, the computer program product comprising:
a computer-readable storage medium having computer-readable program code embodied therewith, the computer-readable program code executable by one or more computer processors to:
request that an operating system kernel of a computer system open the file of the file system, the file system residing in a space that includes the operating system kernel;
in response to the request to open, receive a file handle from the operating system kernel for accessing the file of the file system directly from a buffer residing in user space and not in the file system, by a user process;
make a request to a special function unit of the computer system to read one or more blocks of the file contained in the file system using the file handle,
wherein the special function unit is attached to a CPU of the computer system that runs the operating system kernel and the user process, obtains the one or more blocks from the file of the file system without making system calls to the operating system kernel, and adds the one or more blocks directly to the user space buffer; and
read data directly from the file of the file system with aid of the special function unit by reading the data from the buffer residing in the user space.

15. The computer program product of claim 14, wherein requesting that the operating system kernel open the file includes the computer-readable program code being executable to:

make an open system call to the operating system kernel by the user process, wherein the operating system kernel verifies the call, creates the file handle for the file, enables the special function unit to receive requests to read blocks of the file, registers the file handle with the special function unit, adds an entry to a file table to record an association between the user process and the file, and sends the file handle to the user process making the request.

16. The computer program product of claim 15, wherein the file system is part of the computer system that includes the special function unit and the CPU.

17. The computer program product of claim 14, wherein the computer-readable code being executable to make the request to the special function unit includes the computer-readable program code being executable to send a read request specifying the file handle, a file offset, a size and the user space buffer to the special function unit.

18. The computer program product of claim 17, wherein in response to receiving the read request, the special function unit notifies the user process that the one or more blocks are available after adding the one or more blocks to the user space buffer.

19. The computer program product of claim 17, wherein the computer-readable program code is further executable to:

issue a request to write data to the opened file; and in response, receive an indication that the write request to the opened file is not allowed.

20. The computer program product of claim 17, wherein the computer-readable program code is further executable to:

issue a request to write data to the opened file; and in response to the request to write, receive an indication that the write request to the opened file is not allowed; and in response to the indication, all of the blocks related to the file are removed from the user space buffer.

\* \* \* \* \*